United States Patent
Agarwal et al.

(10) Patent No.: US 11,088,982 B1
(45) Date of Patent: Aug. 10, 2021

(54) PREVENT SENDING EMAILS TO UNINTENDED RECIPIENTS

(71) Applicant: International Business Machines Corporation, Armonk, NY (US)

(72) Inventors: Pranab Agarwal, Oxenford (AU); Narayana Aditya Madineni, Southport (AU); Chia-Le Cheng, Southport (AU); Shane Nicholas Cress, Wendouree (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/015,733

(22) Filed: Sep. 9, 2020

(51) Int. Cl.
  *H04L 12/58* (2006.01)
  *H04L 29/08* (2006.01)
  *G06K 9/62* (2006.01)

(52) U.S. Cl.
  CPC ............ *H04L 51/28* (2013.01); *G06K 9/6215* (2013.01); *H04L 51/12* (2013.01); *H04L 67/306* (2013.01)

(58) Field of Classification Search
  CPC ....... H04L 51/28; H04L 67/306; H04L 51/12; G06K 9/6215
  See application file for complete search history.

(56) References Cited

U.S. PATENT DOCUMENTS

| | | | |
|---|---|---|---|
| 8,103,726 B2 | 1/2012 | Stoddard | |
| 8,606,867 B2 | 12/2013 | Deshpande | |
| 2009/0172109 A1 | 7/2009 | Cameron | |
| 2009/0210504 A1* | 8/2009 | Shuster | H04L 51/30 709/206 |
| 2010/0229246 A1 | 9/2010 | Warrington | |
| 2011/0035451 A1* | 2/2011 | Smith | G06Q 10/107 709/206 |
| 2014/0222815 A1* | 8/2014 | Roth | G06F 16/9535 707/736 |
| 2015/0350144 A1 | 12/2015 | Zeng | |

(Continued)

OTHER PUBLICATIONS

Disclosed Anonymously et al., "Method and apparatus to ensure correct recipient lists on e-mail through context, learning and company profiles", An IP.com Prior Art Database Technical Disclosure, IP.com No. IPCOM000221608D, IP.com Electronic Publication Date: Sep. 14, 2012, 3 pages.

(Continued)

*Primary Examiner* — Austin J Moreau
(74) *Attorney, Agent, or Firm* — Brian M. Restauro

(57) ABSTRACT

A similarity score between a profile of an email sender and one or more profiles associated with one or more respective recipients of the email being sent by the email sender is calculated. In response to determining that the calculated similarity score between the profile of the email sender and at least one profile of the one or more profiles associated with a respective recipient of the one or more respective recipients does not exceed a first threshold value, a relevance score between a context of the email and each of the one or more recipients of the email is calculated. Responsive to determining that the calculated relevance score between the context of the email and each of the one or more recipients of the email does not exceed a second threshold value, a distribution list of the email is updated. The email is transmitted using the updated distribution list.

18 Claims, 4 Drawing Sheets

(56) References Cited

U.S. PATENT DOCUMENTS

2017/0155611 A1\* 6/2017 Ashoori ............... G06F 40/253
2020/0364270 A1\* 11/2020 Harpale ............... G06N 20/00

OTHER PUBLICATIONS

Sieg, Adrien, "Text Similarities : Estimate the degree of similarity between two texts", Jul. 4, 2018, 4 pages, <https://medium.com/@adriensieg/text-similarities-da019229c894>.

Disclosed Anonymously et al., "System and Method to track recipient inclusion /Exclusion and their participation in a email conversation", An IP.com Prior Art Database Technical Disclosure, IP.com No. IPCOM000199912D, IP.com Electronic Publication Date: Sep. 21, 2010, 6 pages.

\* cited by examiner

PREVENT SENDING EMAILS TO UNINTENDED RECIPIENTS

BACKGROUND

The present invention relates generally to the field of emails, and more particularly to prevent the sending of emails to unintended recipients.

Emailing is one of the most popular forms of communication between people in use today, possibly second in popularity only to texting. Businesses use email for both intercompany communication (e.g., employees are able to easily communicate with one another world-wide) as well as intracompany communication for communicating with current customers, potential customers, suppliers, regulatory agencies, etc. Personal, non-business uses for email include, but are not limited to, friend and family communication (e.g., keeping in touch with distant family, sending photos to parents and grandparents, etc.), communicating with an online store (e.g., registering a complaint, returning an item, etc.), sending a letter to a government representative (e.g., discussing a topic important to you with your local representative), and the like. A 2019 assessment estimates that there are 3.8 billion email users across the globe, and that number is projected to increase to 4.3 billion users by 2022.

SUMMARY OF THE INVENTION

Embodiments of the present invention include an approach for preventing the sending of emails to unintended recipients. In one embodiment, a similarity score between a profile of an email sender and one or more profiles associated with one or more respective recipients of the email being sent by the email sender is calculated. In response to determining that the calculated similarity score between the profile of the email sender and at least one profile of the one or more profiles associated with a respective recipient of the one or more respective recipients does not exceed a first threshold value, a relevance score between a context of the email and each of the one or more recipients of the email is calculated. In response to determining that the calculated relevance score between the context of the email and each of the one or more recipients of the email does not exceed a second threshold value, a distribution list of the email is updated. The email is transmitted using the updated distribution list.

DETAILED DESCRIPTION

Embodiments of the present invention recognize that the number of emails sent daily is a large number. Many employees of many business send multiple emails every workday. Consequently, those same employees receive many of the emails. Whether a received email requires a reply, is only informational, includes an assignment, or was received unintentionally (e.g., from someone using the 'reply all' feature prevalent in many email programs and applications) is a decision that must be made several times a day by multiple employees of every business. A method is needed to determine whether or not an email generated and distributed by a sender to a plurality of recipients should actually be received by all of said recipients.

Embodiments of the present invention recognize that there may be a method, computer program product, and computer system for preventing the distribution (i.e., sending) of emails to unintended recipients. In an embodiment, recipient profiles are generated and used in determining a similarity score between a sender of an email and the distribution list of said email. Further in the embodiment, the recipient profile is used again to determine a relevance between a recipient and the context of said email. Responsive to the sender confirming an unintended recipient, the method, computer program product, and computer system dynamically updates the distribution list of the email by removing any number of unintended recipients included in the distribution list, thereby preventing said unintended recipients from receiving the email.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
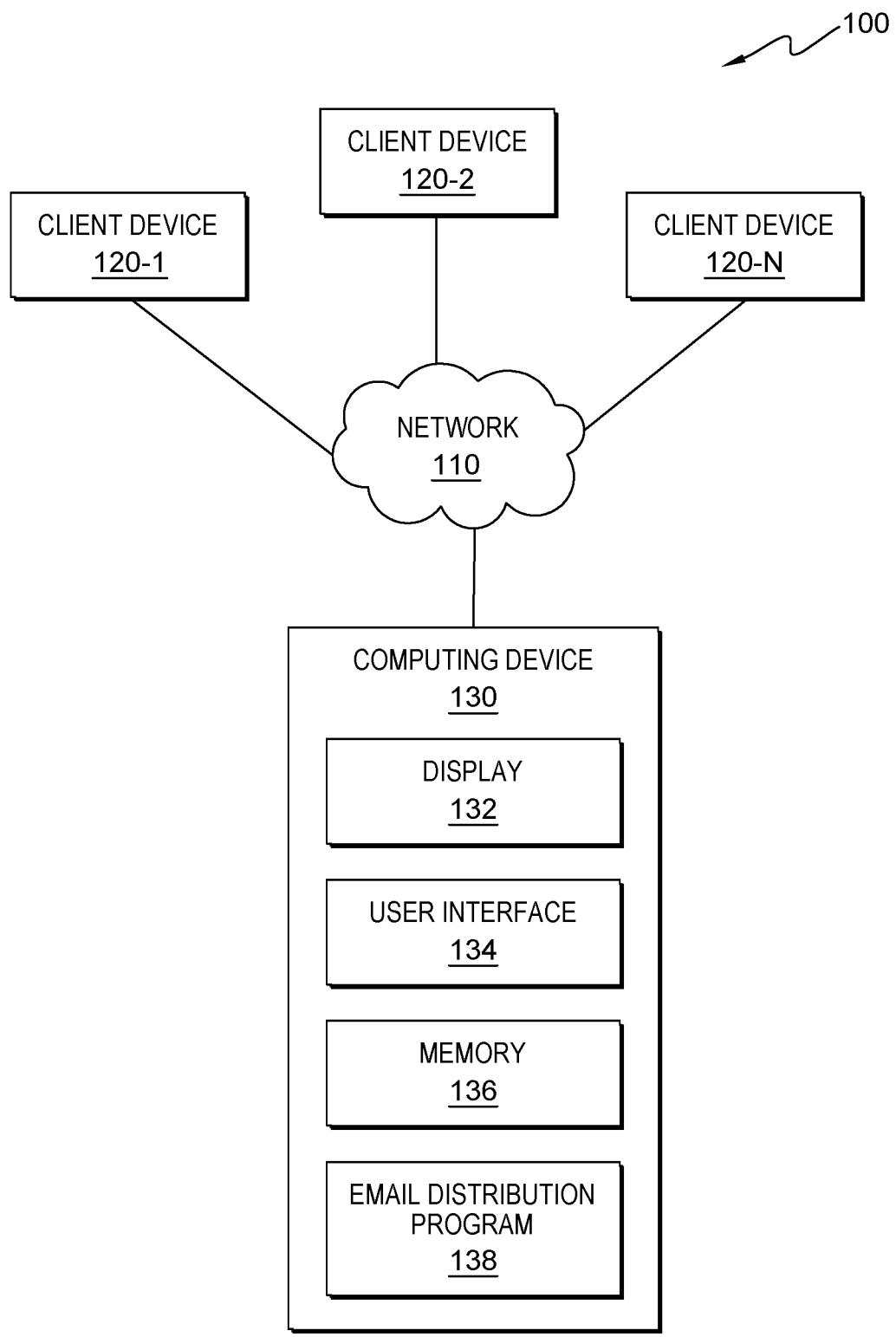
FIG. 1 depicts a functional block diagram illustrating a computing environment which includes an email distribution program, in accordance with an embodiment of the present invention.

FIG. 1 is a functional block diagram illustrating a computing environment, generally designated 100, in accordance with one embodiment of the present invention. FIG. 1 provides only an illustration of one implementation of the present invention and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes client device 120-1, client device 120-2, client device 120-N, and computing device 130, interconnected by network 110. In example embodiments, computing environment 100 includes other computing devices (not shown in FIG. 1) such as smartwatches and other wearable technology, cell phones, smartphones, phablets, tablet computers, additional laptop computers, additional desktop computers, other computer servers, or any other computer system known in the art, interconnected with client device 120-1, client device 120-2, client device 120-N, and computing device 130 over network 110. For ease of readability, client device 120-N will be used (where feasible) in this paper to collectively refer to client device 120-1, client device 120-2, and client device 120-N (i.e., any instance of client device 120).

In embodiments of the present invention, client device 120-N and computing device 130 are connected to network 110, which enables client device 120-N and computing device 130 to access other computing devices and/or data not directly stored on client device 120-N and computing device 130. Network 110 may be, for example, a short-range, low power wireless connection, a local area network (LAN), a telecommunications network, a wide area network (WAN) such as the Internet, or any combination of the four, and include wired, wireless, or fiber optic connections. Network 110 includes one or more wired and/or wireless networks that are capable of receiving and transmitting data, voice, and/or video signals, including multimedia signals that include voice, data, and video information. In general, network 110 is any combination of connections and protocols that will support communications between client device 120-N and computing device 130, and any other computing devices (not shown in FIG. 1) connected to network 110, in accordance with embodiments of the present invention.

In an embodiment, client device 120-N is one of any number of client computing devices which include an email program or application (not shown in FIG. 1) accessible by computing device 130 over network 110. According to an embodiment of the present invention, client device 120-N is a desktop or laptop computer. Client device 120-N be, for example, a computer used by a company employee to send and receive company emails. In various embodiment, there are any number of client device 120-N in FIG. 1.

According to an embodiment of the present invention, computing device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, computing device 130 can be a standalone computing device, a management server, a web server, a mobile computing device, or any other electronic device or computing system capable of receiving, transmitting, and processing data. In other embodiments, computing device 130 can represent computing systems utilizing multiple computers as a server system, such as in a cloud computing environment. In certain embodiments, computing device 130 represents a computer system utilizing clustered computers and components (e.g., database server computers, application server computers, etc.) that act as a single pool of seamless resources when accessed by elements of computing environment 100. In general, computing device 130 is representative of any electronic device or combination of electronic devices capable of executing computer readable program instructions. In an embodiment, computing environment 100 includes any number of computing device 130. Computing device 130 may include internal and external hardware components as depicted and described in further detail with respect to FIG. 5, in accordance with embodiments of the present invention. According to an embodiment of the present invention, computing device 130 includes display 132, user interface 134, memory 136, and email distribution program 138.

According to an embodiment, display 132 is an electronic visual device for a desktop computer, laptop computer, tablet computer, smartphone, smart-watch, and the like. Display 132 may include a touchscreen which is an input device layered on top of the display for allowing a user to control an electronic device via simple or multi-touch gestures by touching display 132 with a special stylus and/or one or more fingers. Display 132 displays open programs and applications, such as an email program, allowing a user of computing device 130 to interact with the open programs and applications via a keyboard, mouse, and buttons (not shown in FIG. 1). Display 132 may be a thin film transistor liquid crystal display (TFT-LCD), a flat panel LED (light emitting diode) display, a cathode ray tube (CRT), or any type of display device known in the art or developed in the future. Display 132 may be connected to computing device 130 via VGA (video graphics array), DVI (digital video interface), HDMI (High Definition Multi-Media Interface), or any other connection type known in the art or developed in the future. According to an embodiment, display 132 visually presents an email program to a user via user interface 134.

In an embodiment, user interface 134 provides an interface between a user of computing device 130 and email distribution program 138 (discussed below). User interface 134 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 134 may also be mobile application software that provides an interface between computing device 130 and email distribution program 138. Mobile application software, or an "app," is a computer program designed to run on smartphones, tablet computers and other mobile devices. User interface 134 enables a user of computing device 130 to interact with email distribution program 138, any other programs and applications included on computing device 130 (not shown in FIG. 1), and any other computing devices (not shown in FIG. 1).

According to an embodiment, memory 136 is storage that is written to and/or read by email distribution program 138, and any other programs and applications on computing device 130. In one embodiment, memory 136 resides on computing device 130. In other embodiments, memory 136 resides on client device 120-N or on any other device (not shown in FIG. 1) in computing environment 100, in cloud storage, or on another computing device accessible via network 110. In yet another embodiment, memory 136 represents multiple storage devices within computing device 130. Memory 136 may be implemented using any volatile or non-volatile storage media for storing information, as known in the art. For example, memory 136 may be implemented with a tape library, optical library, one or more independent hard disk drives, multiple hard disk drives in a redundant array of independent disks (RAID), solid-state drives (SSD), or random-access memory (RAM). Similarly, memory 136 may be implemented with any suitable storage architecture known in the art, such as a relational database, an object-oriented database, or one or more tables. In an embodiment of the present invention, email distribution program 138, and any other programs and applications (not shown in FIG. 1) operating on computing device 130 may store, read, modify, or write data to memory 136. In an embodiment of the present invention, data stored to memory 136 includes, but is not limited to, data stored by email distribution program 138 such as recipient profiles and email distribution lists.

In an embodiment, email distribution program 138 can be a program, a subprogram of a larger program, an application, a plurality of applications, or mobile application software, which functions to prevent an email from being sent to one or more unintended recipients. According to an embodiment, an unintended recipient is a person on an email distribution list that should not receive the email associated with the distribution list. A program is a sequence of instructions written to perform a specific task. In an embodiment, email distribution program 138 runs independently. In other embodiments, email distribution program 138 depends on system software and/or other programs (not shown in FIG. 1) to execute. According to an embodiment, email distribution program 138 is a cognitive system based on artificial intelligence utilizing machine learning and deep learning that (i) determines the similarity between a sender of an email and one or more intended recipients of the email using the Cosine Similarity method or any other comparable method known in the art, (ii) determines a relevance between the context of the email and the one or more recipients using the Term Frequency method or any other comparable method known in the art, and based on said determinations, may dynamically update the distribution list. According to the embodiment, users of email distribution program 138 may be required to opt-in (i.e., acknowledge use of the program). When a user opt-in, said user is notified of the opt-in status and is further notified whenever data associated with said user is collected or otherwise used. In one embodiment, email distribution program 138 functions as a stand-alone program residing on computing device 130. In another embodiment, email distribution program 138 includes an email application which is used by a user of computing device 130 for sending and receiving emails. In yet another embodiment, email distribution program 138 works in conjunction with other programs, applications, etc., (such as an email program) found in computing environment 100. In yet another embodiment, email distribution program 138 resides on other computing devices (not shown in FIG. 1) in computing environment 100, which are interconnected to computing device 130 via network 110.

According to an embodiment, email distribution program 138 receives an indication of an email. In the embodiment, email distribution program 138 determines the intended recipients of said email. Further in the embodiment, email distribution program 138 retrieves recipient profiles for said intended recipients. Further yet in the embodiment, email distribution program 138 calculates a similarity score between the sender of the email and each intended recipient. Further yet in the embodiment, responsive to the similarity exceeding a threshold, email distribution program 138 calculates a relevance score between the context of the email and each intended recipient. Further yet in the embodiment, responsive to the relevance score exceeding a threshold, email distribution program 138 transmits a prompt to the email sender. Further yet in the embodiment, responsive to receiving a positive response from the sender, email distribution program 138 updates the distribution list. Further yet in the embodiment, email distribution program 138 transmits the email to the updated distribution list.

Figure 2:
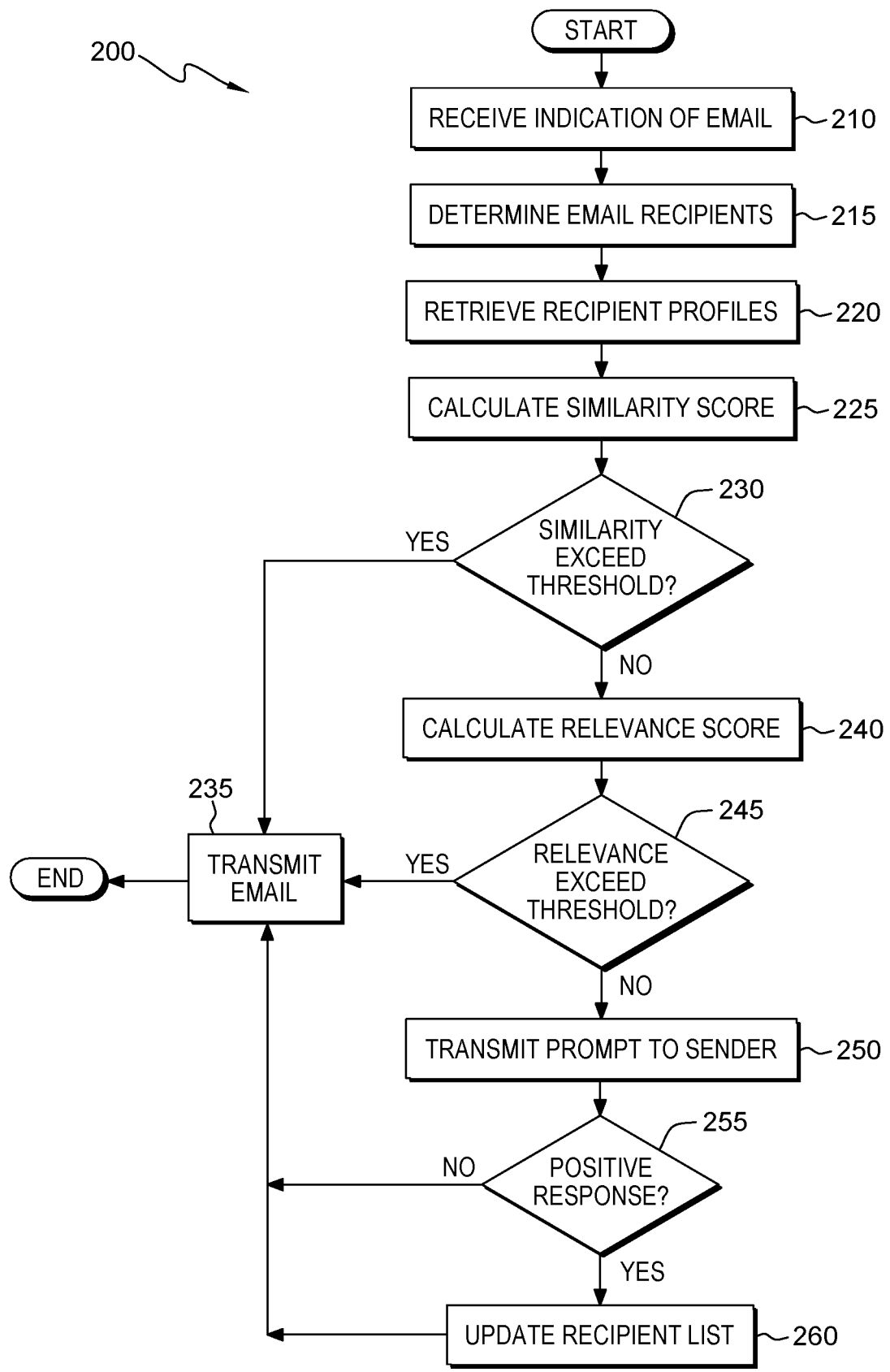
FIG. 2 is a flowchart depicting operational steps of an email distribution program providing for the prevention of sending email to an unintended recipient, on a computing device within the computing environment of FIG. 1, in accordance with an embodiment of the present invention.

FIG. 2 is a flowchart of workflow 200 depicting a method for dynamically preventing the sending of emails to unintended recipients. In one embodiment, the method of workflow 200 is performed by email distribution program 138. In an alternative embodiment, the method of workflow 200 is performed by any other program in computing environment 100 working with email distribution program 138. In an embodiment, a user of computing device 130 invokes workflow 200 upon opening an email application. In an alternative embodiment, a user of computing device 130 invokes workflow 200 upon creating or updating an email distribution list.

In an embodiment, email distribution program 138 receives an indication of an email (step 210). In other words, email distribution program 138 receives an indication of a user preparing to send an email to one or more recipients. According to an embodiment, the indication is triggered by at least one of an email program or application opening, an action such as 'reply', 'reply all', 'courtesy copy', 'blind copy', 'forward', and 'send' being taken by a user in an email program, an address field being filled in with at least one recipient email address by a user, a computing device (e.g., a smartphone, a laptop computer, a tablet computer, a desktop computer, etc.) being powered on, and any other like action. In an embodiment, email distribution program 138 receives an indication of an email based on a user opening an email program (not shown in FIG. 1) on computing device 130. For example, Vic opens an email program on a tablet and a program on the tablet receives an indication of an email being composed by Vic.

According to an embodiment of the present invention, email distribution program 138 determines email recipients (step 215). In other words, email distribution program 138 determines the names of the recipients of the email being created by the email sender. In one embodiment, email distribution program 138 determines the email recipient names based on the actual email address (e.g., the address 'john.doe@xyz.com' is associated with the name 'John Doe'). In another embodiment, email distribution program 138 determines the name of the recipient based on an association between a name and an email address that is stored to a memory (e.g., the name Jane Doe' is associated with the address 'JD@xyx.com' which is stored to a local memory, such as memory 136). In yet another embodiment, email distribution program 138 determines the name of the recipient after retrieving the recipient profile. In yet another embodiment, email distribution program 138 uses an address book to determine the name of the recipient by cross-referencing the email address entered by the sender. According to an embodiment, email distribution program 138 determines the names of the recipients of the email by one or more of the previously described techniques. For example, a program on the tablet determines that Vic is sending an email to the following recipients: Ann, Bill, Chad, Doug, Ed, Fran, and Gil.

In an embodiment, email distribution program 138 retrieves recipient profiles (step 220). In other words, responsive to determining the email recipients, email distribution program 138 retrieves the available recipient profiles for each of the determined recipients. According to an embodiment, a recipient profile is a record that contains information about the recipient (i.e., user information) such as name, email address, job title, job description, job skills from current and previous jobs, current email contact list, resume, work teams the recipient belongs to, products the recipient supports (or has supported), job location, employee hierarchy, company information, and any other available information regarding the recipient. In the embodiment, a comparable profile is also available for the email sender. Both profiles are stored to a memory and are considered 'living documents' meaning that the profiles are dynamically updated on a predetermined frequency (e.g., weekly, monthly, etc.) so that the accuracy of the profiles are maintained. In an embodiment, if a recipient profile is not located for one or more of the determined recipients, email distribution program 138 creates the recipient profile(s) in real-time, after obtaining an opt-in approval from said one or more recipients, with all of the available user information for said one or more recipients. In an embodiment, email distribution program 138 retrieves the recipient profiles from memory 136 on computing device 130. For example, the program on the tablet retrieves the recipient profiles for Ann, Bill, Chad, Doug, Ed, Fran, and Gil from a memory on the tablet.

According to an embodiment of the present invention, email distribution program 138 calculates a similarity score (step 225). In other words, email distribution program 138 calculates a similarity score between the profile of the email sender and each of the recipient profiles for the determined recipients of the email. In an embodiment, email distribution program 138 uses any method known in the art to calculate the similarity scores. One such method is the Cosine Similarity method. This method will be explained in detail in the FIG. 3 discussion below. According to an embodiment, email distribution program 138 calculates a similarity score between the email sender and the determined recipients of the email. For example, the program on the tablet calculates a similarity score between Vic and each of Ann, Bill, Chad, Doug, Ed, Fran, and Gil.

According to some embodiments, email distribution program 138 determines whether the similarity score exceeds a threshold (decision step 230). In other words, responsive to calculating the similarity scores, email distribution program 138 determines whether the calculated similarity score between the sender and the determined recipients exceeds a threshold value. In an embodiment, the similarity score is a measure of how similar names, terms, and phrases are to one another, and scores range between '0' and '1' (with '0' being the lowest, or least similar, and '1' being the highest, or most similar). In the embodiment, the threshold value is determined by at least one of a user (such as the email sender), email distribution program 138, any known statistical method, or any other method known in the art. In one embodiment (decision step 230, YES branch), email distribution program 138 determines that the calculated similarity score exceeds a threshold value for all of the intended recipients; therefore, email distribution program 138 proceeds to step 235 to transmit the email. In the embodiment (decision step 230, NO branch), email distribution program 138 determines that one or more calculated similarity scores (for one or more of the recipients) does not exceed the threshold value; therefore, email distribution program 138 proceeds to step 240 to calculate a relevance score.

According to an embodiment of the present invention, email distribution program 138 transmits email (step 235). In other words, responsive to determining that the similarity score exceeded the threshold for all of the determined recipients, email distribution program 138 transmits the email to said recipients (i.e., using the original distribution list). In an embodiment, email distribution program 138 transmits the email via the email program or application used by the email sender. In another embodiment, email distribution program 138 transmits the email via any available email program or application. In yet another embodiment, email distribution program 138 transmits the email via any method known in the art for transmitting emails. According to an embodiment, email distribution program 138 transmits the email over network 110 to client device 120-N. For example, the program on the tablet transmits the email to Ann, Bill, Chad, Doug, Ed, Fran, and Gil using the email program opened by Vic.

In an embodiment, email distribution program 138 calculates a relevance score (step 240). In other words, responsive to determining that the similarity score did not exceed the threshold, email distribution program 138 calculates a relevance score between the context of the email being sent and each of the determined recipients of said email. In the embodiment, relevance is a measure of how closely items are related or connected to one another (e.g., how closely the context of the email is related to the recipients the comprise the distribution list). According to an embodiment, email distribution program 138 uses any technique known in the art for calculating the relevance scores. One such method is the Term Frequency method. This method will be explained in detail in the FIG. 4 discussion below. In an embodiment, email distribution program 138 uses natural language processing, machine learning, other methods known in the art to determine the context of the email. The context of the email is the primary purpose of the email (i.e., what comprises the email?). For example, an email from a manager to their department that reads "Send me your monthly reports!" is a request for the department members to send their reports to the manager. If the manager had inadvertently listed an email address for a spouse, said spouse would be an unintended recipient because the context of the email (monthly reports) would not be applicable to said spouse. According to one embodiment, email distribution program 138 calculates a relevance score for each of the determined recipients. According to another embodiment, email distribution program 138 calculates a relevance score for only the recipients whose similarity score did not exceed the threshold for similarity. In an embodiment, email distribution program 138 calculates a relevance score between the context of the email and each of the determined recipients of the email. For example, the program on the tablet calculates a relevance score between the context of the email being sent by Vic and each of Ann, Chad, Ed, Fran, and Gil as the similarity scores between Vic and each of Bill and Doug exceeded the threshold similarity.

According to an embodiment of the present invention, email distribution program 138 determines whether the relevance score exceeds a threshold (decision step 245). In other words, responsive to calculating the relevance scores, email distribution program 138 determines whether the calculated relevance scores for the context of the email and each of the recipients (for whom a relevance score was calculated) exceeds a threshold value. In an embodiment, the relevance score is a measure of how relevant the context of the email being sent is to each of the determined recipients, and scores include any real number greater than '0'. In the embodiment, the threshold value is determined by at least one of a user (such as the email sender), email distribution program 138, any known statistical method, or any other method known in the art. In one embodiment (decision step 245, YES branch), email distribution program 138 determines that the calculated relevance score exceeds a threshold value for each of the intended recipients being considered; therefore, email distribution program 138 returns to step 235 to transmit the email as previously described using the original distribution list. In the embodiment (decision step 245, NO branch), email distribution program 138 determines that one or more calculated relevance scores (for one or more of the recipients) does not exceed the threshold value; therefore, email distribution program 138 proceeds to step 250 to transmit a prompt to the sender.

In an embodiment, email distribution program 138 transmits prompt to sender (step 250). In other words, responsive to determining that at least one relevance score did not exceed the threshold for each of the recipients considered, email distribution program 138 transmits a prompt to the email sender. According to an embodiment, the transmitted prompt is a query to the email sender asking whether the sender has included unintended recipients in the distribution list of the email. In the embodiment, email distribution program 138 identifies the names and email addresses of the potential unintended recipients to the email sender based on the similarity and relevance scores. Further in the embodiment, email distribution program 138 uses any method known in the art for transmitting the prompt to the user. In an embodiment, email distribution program 138 transmits a prompt to the email sender; said prompt is displayed in user interface 134 via display 132 on computing device 130. For example, the program on the tablet transmits a prompt to Vic indicating that Chad may be an unintended recipient and asking whether the distribution list should be updated to remove Chad from said list.

According to an embodiment of the present invention, email distribution program 138 determines whether a positive response was received from the email sender (decision step 255). In other words, responsive to transmitting a response to the email sender, email distribution program 138 determines whether a positive response was received from the email sender. In one embodiment (decision step 255, NO branch), email distribution program 138 determines that a positive response was not received from the email sender; therefore, email distribution program 138 returns to step 235 to transmit the email with the original distribution list. In the embodiment (decision step 255, YES branch), email distribution program 138 determines that a positive response was received from the email sender (i.e., the sender has included an unintended recipient in the original distribution list); therefore, email distribution program 138 proceeds to step 260 to update the original distribution list.

In an embodiment, email distribution program 138 updates the recipient list (step 260). In other words, responsive to receiving a positive response from the email sender that the original distribution list includes at least one unintended recipient, email distribution program 138 updates the original distribution list for the email. According to one embodiment, email distribution program 138 deletes the at least one email address of the unintended recipient from the original distribution list. According to another embodiment, email distribution program 138 highlights (or otherwise indicates) the at least one email address of the unintended recipient to the email sender via user interface 134 allowing the sender to confirm the at least one unintended recipient and delete the associated email address from the original distribution list. In an embodiment, email distribution program 138 updates the original distribution list by deleting the at least one email address of the unintended recipient from the original distribution list thus creating a new distribution list for the email. Email distribution program 138 then returns to step 235 to transmit the email using the new (i.e., updated) distribution list. For example, the program on the tablet indicates to Vic via a flashing email address associated with Chad that Chad is an unintended recipient; Vic then deletes the flashing email address 'chadtheman@xyz.com', thus updating the original distribution list. Subsequent to this action, the email is transmitted by the program on the laptop (as previously described) using the updated distribution list.

Figure 3:
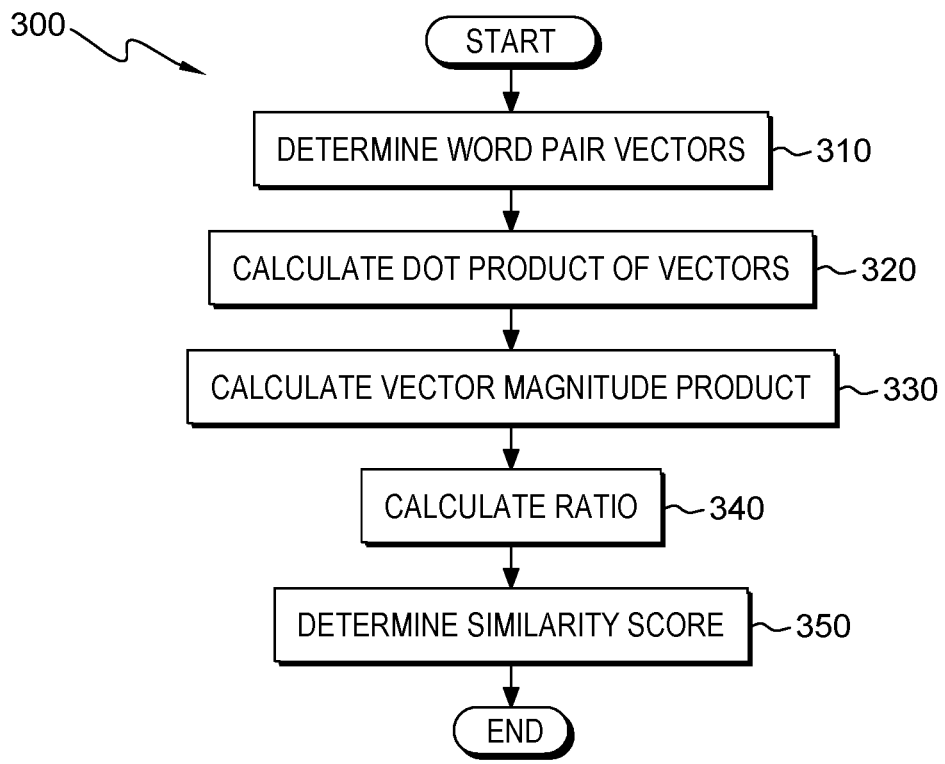
FIG. 3 is a flowchart depicting operations steps for determining a similarity score between a profile of an email sender and one or more recipient profiles, in accordance with an embodiment of the present invention.

FIG. 3 is a flowchart of workflow 300 depicting operational steps for determining a similarity score between the profile of an email sender and one or more recipient profiles using the Cosine Similarity method which is well known in the art. In one embodiment, the method of workflow 300 is performed by email distribution program 138. In an alternative embodiment, the method of workflow 300 is performed by any other program in computing environment 100 working with email distribution program 138. In an embodiment, a user of computing device 130 invokes workflow 300 upon opening an email application. In an alternative embodiment, a user of computing device 130 invokes workflow 300 upon creating or updating an email distribution list.

In an embodiment, email distribution program 138 determines word pair vectors (step 310). In other words, email distribution program 138 (i) identifies the similar attributes in the profile of the email sender and the attributes in the recipient profiles (i.e., identify the organization associated with the email sender and that of each recipient, identify the job role associated with the email sender and that of each recipient, etc.), (ii) breaks the words into their character components, (iii) counts the number of occurrences of each letter in each word, (iv) determines common sets of characters, and (v) calculates the length of the words to determine the word pair vectors. If an attribute for one of the email sender or one of the recipients is blank or missing in an associated profile, said attribute is assigned a value of zero.

According to an embodiment, email distribution program 138 calculates a dot product of the vectors (step 320). In other words, email distribution program 138 iterates through the list of common characters amongst the words, counts the value of each iterated character, and then multiplies the two values to calculate the dot product of the two vectors.

In an embodiment, email distribution program 138 calculates a vector magnitude product (step 330). In other words, email distribution program 138 calculates the product of the lengths of both word vectors.

According to an embodiment of the present invention, email distribution program 138 calculates a ratio (step 340). In other words, email distribution program 138 divides the calculated dot product by the calculated vector magnitude to determine the ratio. The calculated ratio determines the angle (i.e., similarity) between the 2 word vectors.

In an embodiment, email distribution program 138 determines a similarity score (step 350). In other words, email distribution program 138 assigns a similarity score of '1' to an angle of '0' (or near-zero) degrees and a similarity score of '0' to an angle of '90' degrees (i.e., a perpendicular angle between the two word vectors). A similarity score of '0' means that the two words are identical while a similarity score of '1' means that the two words are not related to one another. Using the similarity score and a threshold (e.g., 0.8), email distribution program 138 is able to determine whether the profile of the email sender and one or more recipient profiles are similar and thus, identifying whether the email distribution list potentially includes unintended recipients.

In an alternate embodiment, attributes in each profile are identified and a vector is created which includes the identified attributes (e.g., ['job role', 'organization', 'skills', 'products supported', etc.]. Each vector member is assigned a numerical value (e.g., if the job role is an engineer, assign a value of '1'; if the job role is a chemist, assign a value of '2', if the job role is a mathematician, assign a value of '3', etc.). Missing or blank attributes are again assigned a value of zero. Cosine similarity is performed between the two vectors (i.e., one for the email sender, one for one of the recipients) to determine the similarity between the two profile vectors and thus, the email sender and the recipient.

Figure 4:
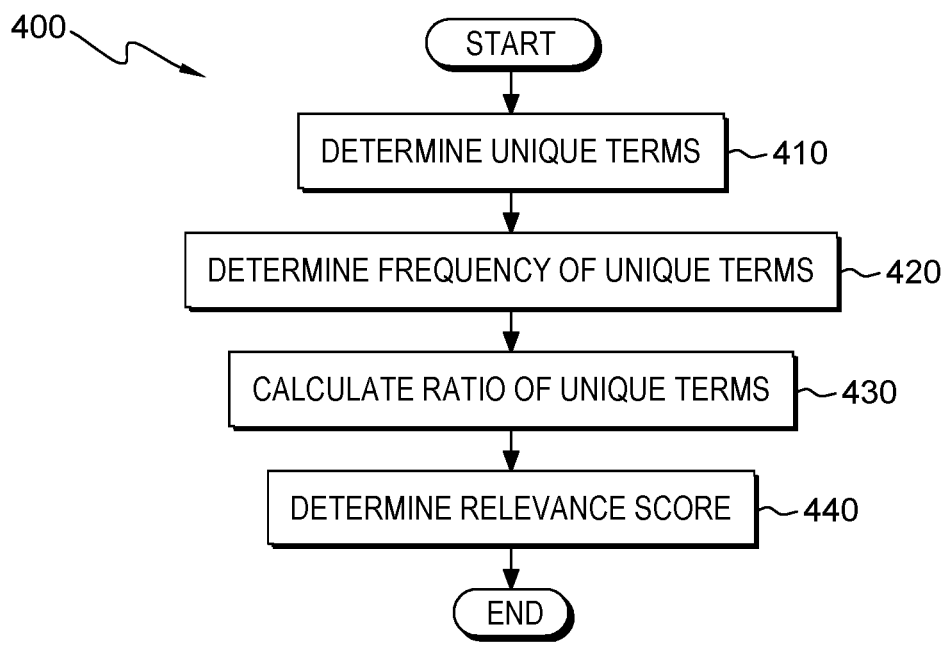
FIG. 4 is a flowchart depicting operational steps for determining a relevance score between the context of an email and one or more recipient profiles, in accordance with an embodiment of the present invention.

FIG. 4 is a flowchart of workflow 400 depicting operational steps for determining a relevance score between the context of an email and one or more recipient profiles using the Term Frequency method which is well known in the art. In one embodiment, the method of workflow 400 is performed by email distribution program 138. In an alternative embodiment, the method of workflow 400 is performed by any other program in computing environment 100 working with email distribution program 138. In an embodiment, a user of computing device 130 invokes workflow 400 upon opening an email application. In an alternative embodiment, a user of computing device 130 invokes workflow 400 upon creating or updating an email distribution list.

According to an embodiment, email distribution program 138 determines unique terms (step 410). In other words, email distribution program 138 performs stop word removal and stemming for the contents of the email and each of the one or more recipient profiles. This removes the words that will not be considered in the analysis. Email distribution program 138 then determines the unique words in what remains of the email content and recipient profiles.

In an embodiment, email distribution program 138 determines frequency of unique terms (step 420). In other words, email distribution program 138 identifies 'key terms' (e.g., job responsibilities, roles, projects, etc.) within the remaining unique terms and determines the frequency of said unique terms in the email contents and recipient profiles.

According to an embodiment of the present invention, email distribution program 138 calculates a ratio of unique terms (step 430). In other words, email distribution program 138 divides the determined frequency of unique terms (for each of the by the total number of terms to calculate the ratio of unique terms. This yields the Term Frequency of each unique term. Summing all of the individual term frequencies In an embodiment, email distribution program 138 determines a relevance score (step 440). In other words, email distribution program 138 sums together all of the individual term frequencies for each unique term to calculate a relevance score which represents the relevance of the email content to each of the determined recipients. The relevance score is any real number greater than '0' and the larger the number, the more relevant the recipient is to the email content.

Figure 5:
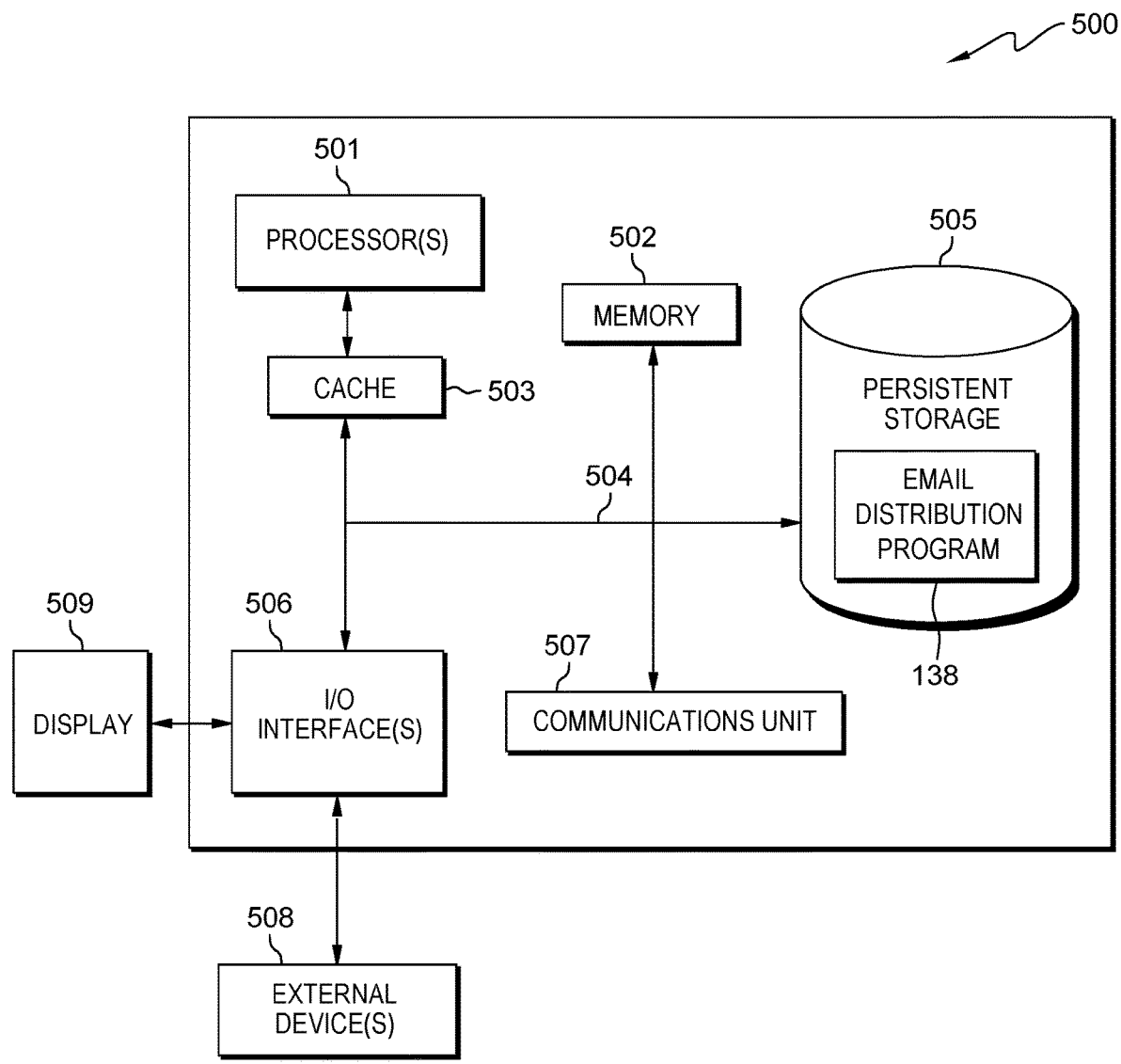
FIG. 5 depicts a block diagram of components of a computing device executing an email distribution program within the computing environment of FIG. 1, in accordance with an embodiment of the present invention.

FIG. 5 depicts computer system 500, which is an example of a system that includes email distribution program 138. Computer system 500 includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
   calculating, by one or more computer processors, a similarity score between a profile of an email sender and one or more profiles associated with one or more respective recipients of the email being sent by the email sender, wherein the profile of the email sender and the one or more profiles associated with the one or more recipients of the email are records that include user information comprising names, email addresses, job titles, job descriptions, job skills from current and previous jobs, resumes, current email contact lists, work teams, supported products, job location, company information, employee hierarchy, and other available information;
   responsive to determining that the calculated similarity score between the profile of the email sender and at least one profile of the one or more profiles associated with a respective recipient of the one or more respective recipients does not exceed a first threshold value, calculating, by one or more computer processors, a relevance score between a context of the email and each of the one or more recipients of the email;

responsive to determining that the calculated relevance score between the context of the email and each of the one or more recipients of the email does not exceed a second threshold value, updating, by one or more computer processors, a distribution list of the email; and transmitting, by one or more computer processors, the email using the updated distribution list.

2. The method of claim 1, further comprising:

responsive to determining that the calculated similarity score between the profile of the email sender and each of the profiles of the one or more profiles associated with the one or more recipients exceeds the first threshold value, transmitting, by one or more computer processors, the email using an original distribution list of the email.

3. The method of claim 1, further comprising:

responsive to determining that the calculated relevance score between the context of the email and each of the one or more recipients of the email exceeds the second threshold value, transmitting, by one or more computer processors, the email using the original distribution list of the email.

4. The method of claim 1, wherein the similarity score is calculated using a Cosine Similarity method.

5. The method of claim 1, wherein the relevance score is calculated using a Term Frequency method.

6. The method of claim 1, wherein the step of updating, by one or more computer processors, a distribution list of the email, comprises:

transmitting, by one or more computer processors, a prompt to the email sender; and responsive to determining that a response from the email sender to the transmitted prompt is positive, updating, by one or more computer processors, the distribution list of the email.

7. The method of claim 6, further comprising:

responsive to determining that the response to the transmitted prompt from the email sender is not positive, transmitting, by one or more computer processors, the email using the original distribution list of the email.

8. A computer program product, the computer program product comprising:

one or more computer readable storage media; and program instructions stored on the one or more computer readable storage media, the program instructions comprising:

program instructions to calculate a similarity score between a profile of an email sender and one or more profiles associated with one or more respective recipients of the email being sent by the email sender, wherein the profile of the email sender and the one or more profiles associated with the one or more recipients of the email are records that include user information comprising names, email addresses, job titles, job descriptions, job skills from current and previous jobs, resumes, current email contact lists, work teams, supported products, job location, company information, employee hierarchy, and other available information;

responsive to determining that the calculated similarity score between the profile of the email sender and at least one profile of the one or more profiles associated with a respective recipient of the one or more respective recipients does not exceed a first threshold value, program instructions to calculate a relevance score between a context of the email and each of the one or more recipients of the email;

responsive to determining that the calculated relevance score between the context of the email and each of the one or more recipients of the email does not exceed a second threshold value, program instructions to update a distribution list of the email; and program instructions to transmit the email using the updated distribution list.

9. The computer program product of claim 8, further comprising program instructions stored on the one or more computer readable storage media, to:

responsive to determining that the calculated similarity score between the profile of the email sender and each of the profiles of the one or more profiles associated with the one or more recipients exceeds the first threshold value, transmit the email using an original distribution list of the email.

10. The computer program product of claim 8, further comprising program instructions stored on the one or more computer readable storage media, to:

responsive to determining that the calculated relevance score between the context of the email and each of the one or more recipients of the email exceeds the second threshold value, transmit the email using the original distribution list of the email.

11. The computer program product of claim 8, wherein the similarity score is calculated using a Cosine Similarity method.

12. The computer program product of claim 8, wherein the relevance score is calculated using a Term Frequency method.

13. The computer program product of claim 8, wherein the program instructions to update a distribution list of the email, comprises:

program instructions to transmit a prompt to the email sender; and responsive to determining that a response from the email sender to the transmitted prompt is positive, program instructions to update the distribution list of the email.

14. The computer program product of claim 13, further comprising program instructions stored on the one or more computer readable storage media, to:

responsive to determining that the response to the transmitted prompt from the email sender is not positive, transmit the email using the original distribution list of the email.

15. A computer system, the computer system comprising:

one or more computer processors;

one or more computer readable storage media; and program instructions stored on the one or more computer readable storage media for execution by at least one of the one or more computer processors, the program instructions comprising:

program instructions to calculate a similarity score between a profile of an email sender and one or more profiles associated with one or more respective recipients of the email being sent by the email sender, wherein the profile of the email sender and the one or more profiles associated with the one or more recipients of the email are records that include user information comprising names, email addresses, job titles, job descriptions, job skills from current and previous jobs, resumes, current email contact lists, work teams, supported products, job location, company information, employee hierarchy, and other available information;

responsive to determining that the calculated similarity score between the profile of the email sender and at least one profile of the one or more profiles associated with a respective recipient of the one or more respective recipients does not exceed a first threshold value, program instructions to calculate a relevance score between a context of the email and each of the one or more recipients of the email;

responsive to determining that the calculated relevance score between the context of the email and each of the one or more recipients of the email does not exceed a second threshold value, program instructions to update a distribution list of the email; and program instructions to transmit the email using the updated distribution list.

16. The computer system of claim 15, further comprising program instructions stored on the one or more computer readable storage media for execution by at least one of the one or more computer processors, to:

responsive to determining that the calculated similarity score between the profile of the email sender and each of the profiles of the one or more profiles associated with the one or more recipients exceeds the first threshold value, transmit the email using an original distribution list of the email.

17. The computer system of claim 15, further comprising program instructions stored on the one or more computer readable storage media for execution by at least one of the one or more computer processors, to:

responsive to determining that the calculated relevance score between the context of the email and each of the one or more recipients of the email exceeds the second threshold value, transmit the email using the original distribution list of the email.

18. The computer system of claim 15, further comprising program instructions stored on the one or more computer readable storage media for execution by at least one of the one or more computer processors, to:

responsive to determining that the response to the transmitted prompt from the email sender is not positive, transmit the email using the original distribution list of the email.

* * * * *